United States Patent [19]

Matsui

[11] 4,057,902
[45] Nov. 15, 1977

[54] MULTIPURPOSE DISK PROTRACTOR

[76] Inventor: Atsushi Matsui, 12, Baban-Cho, Shizuoka, Shizuoka, Japan

[21] Appl. No.: 728,026

[22] Filed: Sept. 30, 1976

Related U.S. Application Data

[63] Continuation of Ser. No. 604,066, Aug. 12, 1975, abandoned.

[30] Foreign Application Priority Data

Aug. 22, 1974  Japan ................................. 49-96355

[51] Int. Cl.² .............................................. G01B 3/12
[52] U.S. Cl. ..................................... 33/1 N; 33/141 R
[58] Field of Search .......... 33/1 N, 1 B, 75 R, 141 R, 33/141 E

[56] References Cited

U.S. PATENT DOCUMENTS

| 925,082 | 6/1909 | Davenport | 33/141 E |
| 1,346,250 | 7/1920 | Puring | 33/1 N |
| 2,003,172 | 5/1935 | Burt | 33/1 N |
| 3,795,053 | 3/1974 | Burke | 33/1 B |

FOREIGN PATENT DOCUMENTS

| 125,743 | 5/1959 | U.S.S.R. | 33/1 N |

Primary Examiner—Richard E. Aegerter
Assistant Examiner—John W. Shepperd

[57] ABSTRACT

A circular disk protractor made of a transparent plate material and having a peripheral circumference of 400 mm has a length scale graduated in millimeters around the circumferential edge thereof from an origin, an angle scale graduated in degrees of angle around a circle concentric with the disk from an origin angularly coincident with the origin of the length scale, and a polar distance scale comprising a plurality of concentric radially spaced apart circles which are concentric with the disk and constitute graduations to indicate distances in millimeters from the center of the disk.

4 Claims, 6 Drawing Figures 4,057,902

MULTIPURPOSE DISK PROTRACTOR

This is a continuation, of application Ser. No. 604,066 filed Aug. 12, 1975 now abandoned.

BACKGROUND OF THE INVENTION

This invention relates generally to angle and distance measuring devices and more particularly to a transparent disk protractor which can be used for many purposes.

An ordinary protractor of the simplest type known heretofore is in the form of a plate of semicircular shape and is used principally for measuring and laying down angles. The only other use to which this simple protractor can be put is measurement of short distances by means of a linear scale provided along the straight-line edge thereof. Known also are protractors comprising a plurality of parts, such as bevel protractors, multiple-arm protractors, and protractors in combination with straight-edges, as in drafting machines. These protractors tend to be of relatively complicated structure requiring precision in fabrication and, being relatively heavy, are not as "handy" as a simple, single-member protractor.

SUMMARY OF THE INVENTION

It is an object of this invention to provide a novel disk protractor of simple structure having many more uses in addition to the two uses recited above in the case of the conventional simple protractor.

Another object of the invention is to provide a disk protractor capable of accurately measuring angles.

Still another object of the invention is to provide a disk protractor which affords easy determination of approximation values of nature trigonometric functions.

A further object of the invention is to provide a disk protractor by which distances, both straight-line and via roads, between points on a map and directions can be easily determined.

According to this invention, briefly summarized, there is provided a multipurpose disk protractor comprising a transparent, circular, planar disk having an outer peripheral circumference of 400 n length units, where n is an integer, and characterized by the inscription thereon of a length graduated in the length units around the circumferential edge of the disk from an origin zero point, an angle scale graduated in degrees of angle around a circle disposed concentrically with the disk from an origin zero degree point angularly coincident with the zero point of the length scale, and a polar distance scale comprising a plurality of concentric radially spaced apart circles disposed concentrically with the disk and constituting graduations to indicate distances in the length unit from the center of the disk.

DETAILED DESCRIPTION

Figure 1:
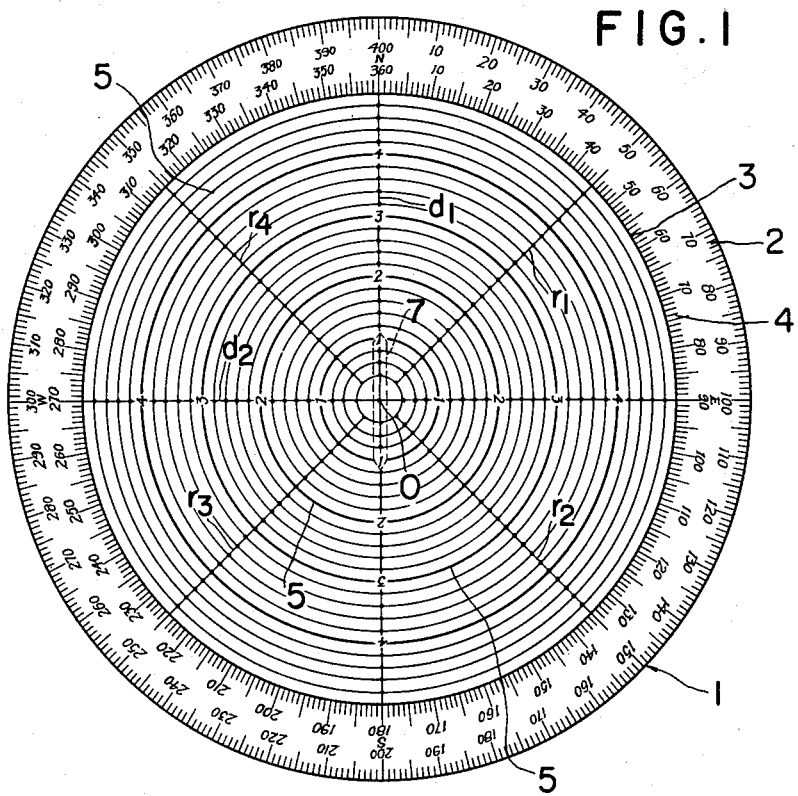
FIGS. 1 and 2 are a plan view and an edge view orthogonal thereto of a disk protractor according to the invention.
Figure 2:
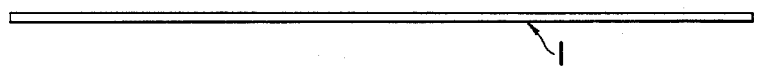
Figure 3:
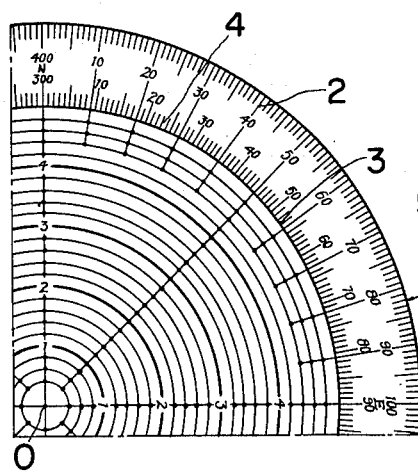
FIG. 3 is a fragmentary plan view of quadrant of the disk protractor for an explanation of the principle of the invention.

Referring to FIG. 1, the disk protractor according to this invention comprises a transparent circular disk 1 made of known material such as a transparent synthetic resin and various markings inscribed thereon as described hereinafter.

The circular disk has a peripheral circumference of a length of 400 mm., which is provided therearound with a distance scale 2 graduated in units of millimeters. A circle 3 of a radius of 50 mm. is inscribed on the circular disk 1 around its center O, and around this circle 3, is an angular scale 4 graduated in units of degrees of angle. The origin (zero angle point) of this angular scale 4 is coincident with the origin of the distance scale 2, both lying on a common diametric line $d_1$, which joins the origins of the scales 4 and 2 and the 180° point of the scale 4 coincident with the 200-mm. point of the scale 2.

Another diametric line $d_2$ is inscribed on the disk 1 to intersect the line $d_1$ perpendicularly thereto. This diametric line $d_2$ passes through the positions of 90° and 270° of the angular scale 4. Around and outside of the angular scale 4, the letters N, E, S, and W representing the compass directions north, east, south, and west, respectively, are inscribed on the disk 1 at the positions of 0° (360°), 90°, 180°, and 270°, respectively.

The provision of radial lines $r_1$, $r_2$, $r_3$, and $i_4$ respectively bisecting the quadrants between the diametric lines $d_1$ and $d_2$ affords convenience. On the inner side of the above mentioned circle 3 and concentrically therewith there is inscribed a polar distance scale 5 comprising a plurality of concentric circles with specific graduated diameters for indicating distances in the diametric direction, either radially outward or inward. While this polar distance scale 5 can be inscribed with graduation intervals of 1 millimeter, it is graduated at invervals of 2 mm. in the instant example. Depending on the requirements, a magnetic compass needle 7 may be provided at the center of the disk 1 as indicated in FIG. 1.

The disk protractor of the above described organization can be used to measure or lay out angles in exactly the same manner as a conventional protractor. In addition, it can be used in the manner described hereinafter.

Before description of the uses of this protractor, the relationship between the 400-mm. distance scale 2 and the 360°angular scale 4 will be considered. This relationship for one quadrant is as set forth in the following table.

| 400-mm. distance scale 2. | 360° angular scale 4 | 400-mm. distance scale 2 | 360° angular scale 4 |
|---|---|---|---|
| 1 | 54' | 20 | 18° |
| 2 | 1° 48' | 30 | 27° |
| 3 | 2° 42' | 40 | 36° |
| 4 | 3° 36' | 50 | 45° |
| 5 | 4° 30' | 60 | 54° |
| 6 | 5° 24' | 70 | 63° |
| 7 | 6° 18' | 80 | 72° |
| 8 | 7° 12' | 90 | 81° |
| 9 | 8° 06' | 100 | 90° |
| 10 | 9° | | |

In the measurement of an angle with the disk protractor of this invention, the length of the arc corresponding to the angle to be measured is read on the 400-mm. distance scale 2, and from this distance reading, the angle is determined. For example, it will be assumed that when a certain angle is measured, the reading on the distance scale 2 is 29.6 mm., which can be converted into degrees and minutes as follows through the use of the preceding table.

| | |
|---|---|
| 20 mm. → | 18° 00' |
| 9 mm. → | 8° 06' |
| 0.6 mm. → (0.1)(5°24') | |
| | = 0° 32' |
| or (0.6)(54') | |
| 29.6 mm. → | 26° 38' |

Figure 4:
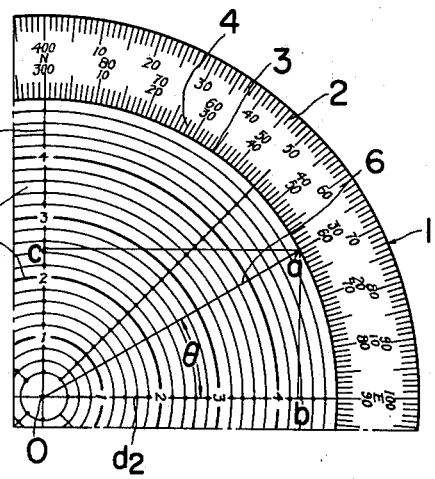
FIG. 4 is a similar plan view indicating the use of the disk protractor for determination of a trigonometric function.

The disk protractor of the invention can be used also for determining values of trigonometric functions such as sines and cosines as indicated in FIG. 4. For example, the values of sine and cosine in the case of an angle $\theta$ of 30° are determined in the following manner. From the point $a$ of intersection of the straight line 6 and the circle 3, a normal line $ac$ is drawn to the diametric line $d_1$ to intersect the same at point $c$, the position of which on the diametric line $d_1$ (relative to center point O) is read on the circular scale 5. In this case, the reading $Oc = 25$. Therefore, $$\sin 30° = = ab/Oa = Oc/Oa = 25/50 = 0.50$$

Thus, the natural trigonometric function sin 30° is determined.

Next, the natural trigonometric function cos 30° is determined by drawing a vertical line $ab$ from the point $a$ to the diametric line $d_2$ to intersect the same at point $b$ and reading the position of the point on the circular scale 5 as $Ob = 43$. Therefore, $$\cos 30° = Ob/Oa = 43/50 = 0.86$$

In this manner, approximate values of natural trigonometric functions of any angle can be determined by a simple procedure without the use of a table of natural trigonometric functions.

In another example of use of the disk protractor of the invention, it can be readily used in conjunction with a map to measure the straight-line distance from a certain geographical point to another geographical point and to measure the distance by road between the two points.

Figures 5, 6:
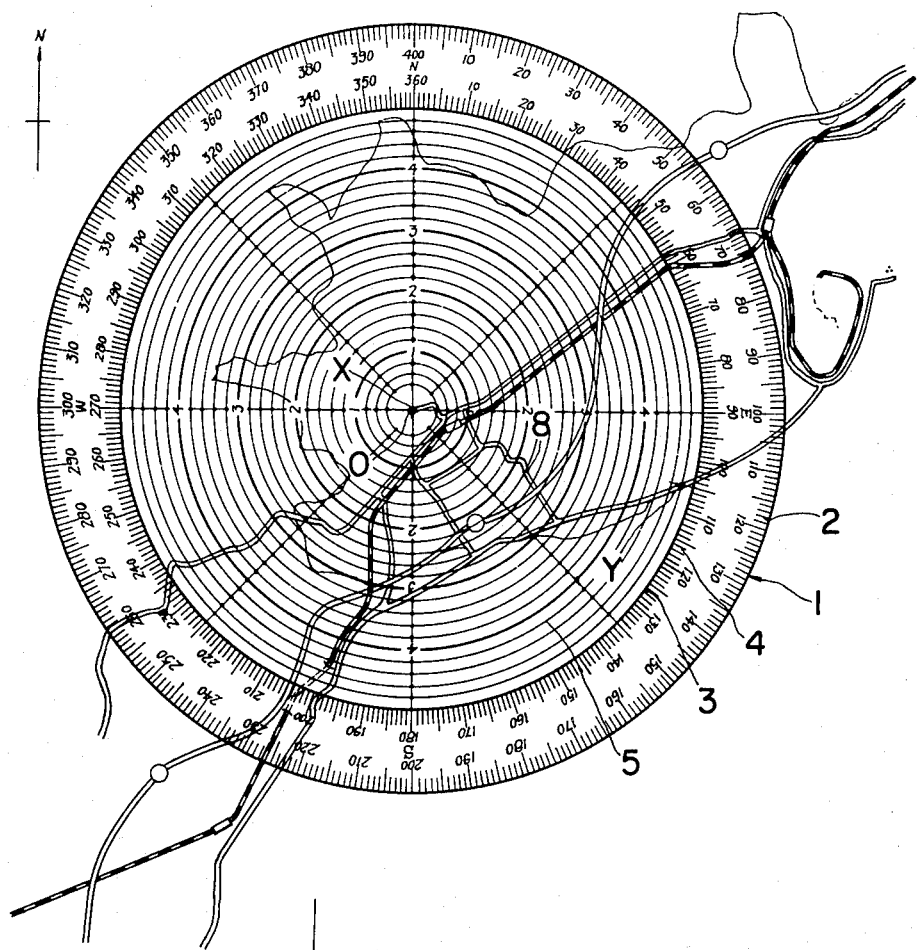
FIG. 5 is a plan view indicating the manner in which the disk protractor of the invention is used in comjunction with a map.
FIG. 6 shows the use of the protractor with a map scale for directly indicating distance.

On a map shown in FIG. 5, two geographical points X and Y are designated. To measure the straight-line distance between these points X and Y, the disk protractor is placed on the map, and its center O is brought into coincidence with one of the two points, say, point X, and the distance of point Y therefrom is read on the polar distance scale 5. At the same time, by retaining the center O of the protractor at the point X and bringing the 0° (360°) angular position into coincidence with the true north direction, it can be learned immediately that the direction of the geographical point Y as viewed from the point X is south-east or, more precisely, approximately 105°. Then, by sliding the protractor to the distance scale 9 of the map and placing the center O of the protractor on the zero distance point on the scale 9, the above mentioned reading of point Y on the polar distance scale 5 can be read directly on the map scale 9 to measure the actual distance in the unit of the scale 9 of the point Y from point X.

In order to determine the distance via a road 8 between the geographical points X and Y, the disk protractor is placed perpendicularly relative to the map with its edge at the zero point of the peripheral distance scale 2 directly contacting the point X on the map, and then the protractor is rolled without slip along the road 8 to the point Y. The reading on the scale 2 at the point of tangency with the point Y is then read. This reading is the road distance in millimeters on the map and is converted into actual road distance by means of the map scale 9.

It will be apparent that, while this invention has been described in the foregoing disclosure with respect to only one embodiment thereof, various modifications can be made therein without departing from the spirit and scope of the invention. For example, instead of the length unit of millimeters, any other length unit can be used depending on the circumstances. Furthermore, the length of the circumference of the circular disk 1 is not necessarily limited to 400 mm. but may be 400 selected units of length of an integral number multiple thereof.

I claim:

1. A disk protractor comprising: a transparent, circular, planar disk having an outer peripheral circumference of 400 n length units, where $n$ is an integer; a length scale graduated in said length units and inscribed along and around the circumferential edge of the circular disk from an origin zero point; an angle scale graduated in degrees of angle and inscribed along and around a circle inscribed concentrically relative to said outer peripheral circumference and having an origin zero point on the same radial line from the center of the circle as the zero point of the length scale; and a polar distance scale comprising a plurality of concentric radially spaced apart circles having a common center coincident with the center of the circular disk and having graduations to indicate distances from the center, the latter circles being equally spaced a distance apart thereof by 2 $n$ of said length units at the outer peripheral circumference.

2. A disk protractor according to claim 1 in which there are further provided first and second mutually perpendicular diametric lines respectively passing through the origin zero point of the angle scale and the 180° graduation point and passing through the 90° and 270° graduation points of the angle graduation.

3. A disk protractor according to claim 2 in which N, E, S, and W marks are inscribed at the angular positions of zero, 90°, 180°, and 270° of the angle scale.

4. A disk protractor according to claim 1 in which the length unit is a millimeter.

* * * * *